United States Patent Office
3,592,789
Patented July 13, 1971

3,592,789
PROCESS FOR PREPARING POLYMER SOLUTION FROM AROMATIC ANHYDRIDES AND ISOCYANATES
Benjamin A. Bolton, Chesterton, Ind., assignor to Standard Oil Company, Chicago, Ill.
No Drawing. Filed Feb. 7, 1968, Ser. No. 703,557
Int. Cl. C08g 51/44, 51/48
U.S. Cl. 260—30.8                                    3 Claims

ABSTRACT OF THE DISCLOSURE

This invention relates to the production of insulating and protective coatings for electric wire and other surfaces. More particularly it relates to the preparation of coating solutions wherein aromatic anhydrides and polyisocyanate are dissolved in a polar solvent boiling above 300° F. at a temperature of about 150° to 300° F. The coating solution is then cooled to room temperature and the resulting solution is applied to metal surfaces and baked to adherent, tough films useful as electrical and missile coatings.

---

This invention relates to a novel process for preparing coating compositions with excellent physical, chemical and thermal resistant properties from aromatic anhydrides and monomeric diisocyanates.

The use of synthetic resins in electrical insulation is not new. In fact, many have found wide commercial acceptance in such applications as, for instance, magnet wire coating. In that process, wire of an appropriate gauge is first successively covered by means of a specialized technique with multiple layers of one or more enamels. The covered wire is then wound into coils for incorporation into motors, generators and the like. Prior to final assembly however, the stator and rotor coils are dipped into special varnishes which when baked will form a firmly binding envelope and will, in addition, often contribute to the total insulation of the system.

For the convenience of the trade and in reference to the operating temperatures to which the enameled wire coils are ultimately destined, a classification has been developed and applied to such enamels (American Institute of Electrical Engineers, Insulation Classification No. 1, June 1957). These classes range from 90° C. to 220° C. A class 220° C. enamel for instance, will be employed in equipment designed for use at temperatures of 220° C. or higher. It is with this particular enamel class that the present invention is primarily concerned.

The introduction of synthetic organic resins in enamels of this 220° C. class is a rather recent development in the art. Yet, because of an excellent balance of properties as compared to the inorganic materials constituting the bulk of the class, the new materials are already used extensively.

It has been found that excellent coating compositions can be prepared by dissolving a diisocyanate and an anhydride in a polar solvent at temperatures of about 150° F. to about 300° F. The resulting coating solution of the partial condensation product of the anhydride and the diisocyanate is stable and cures to a tough, chemical and heat resistant coating at curing temperatures of about 200° to 420° C. In another aspect the invention is directed to a process for producing thermally stable coatings directly from trimellitic anhydride by reacting trimellitic anhydride and aromatic diisocyanate in an organic polar solvent to produce the soluble polymer which upon further heating forms a second polymer which is insoluble in an organic polar solvent.

The process is characterized in that monomeric diisocyanates are reacted with aromatic anhydrides which contain one or more cyclic anhydride groups, and which, where only one anhydride group is present, must contain also at least one hydrogen atom capable of reacting the isocyanato group. The following are examples of the useful diisocyanates: aliphatic diisocyanates such as butane-, hexane- and heptane diisocyanate, aliphatic diisocyanates with a built in ring system such as w,w'-diisocyanate-1,3-dimethylbenzene, w,w'-diisocyanate - 1,4-dimethylcyclohexane, w,w'-diisocyanate-1,4-diethylbenzene and cyclohexane-1,3-, cyclohexane-1,4-, 1-methylcyclohexane-2,4- and dicyclohexylethane-4,4'-diisocyanates. In addition, there may be mentioned mixed aromatic aliphatic and aromatic hydroaromatic diisocyanates such as 4-phenylisocyanate-methylisocyanate, tetrahydronaphthylene-1,5-, hexahydrobenzidine-4,4'- and hexahydrodiphenylmethane-4,4'-diisocyanates, also diisocyanates of benzene and its homologues; for example, 1,3-phenylene-, 1,4-phenylene-, 1-methylenebenzene-2,4- and 1-methylbenzene-2,6-diisocyanate and mixtures of their isomers, mono-, di- and triisopropylbenzyl-diisocyanates, polyisocyanates of naphthalene of diphenyls and of di- and tri-phenylmethane with polynuclear ring systems or of polyphenyl compounds. Examples of the last mentioned classes of substances are naphthalene-1,4-, naphthalene-1,5,-, diphenyl-4,4'-, diphenylmethane-4,4'-, anthraquinone-2,6- and diphenylsulphide-2,4 - diisocyanates, 4,4'-dimethyldiphenylmethane-2,2'-diisocyanate. The polyisocyanates used according to the invention may also be substituted by halogen-, alkoxy-, azo-, nitro-, cyano-, ester- or sulphonic groups. Examples of these are 1-chlorobenzene-, 1-nitrobenzene- and 1-methoxybenzene-2,4-diisocyanate- and benzidine sulphonic-4,4'-diisocyanate. Polyarylpolyisocyanates are preferred. Advantageously, the isocyanato groups are in the meta or para position in the aromatic nucleus and particularly on separate rings when the nucleus has more than one aromatic ring. The preferred diisocyanates are 4,4 methylene bis phenyl-diisocyanate, 4,4 oxybis phenyl-diisocyanate, 1,4-phenyl diisocyanate, 1,3-phenyl diisocyanate, diphenylmethane 3,3'-diisocyanate, diphenylmethane, 4,4'-diisocyanate, diphenylether 3,3'-diisocyanate, diphenylether 4,4'-diisocyanate, naphthalene diisocyanate, diphenyl 1,4'-diisocyanate, diphenyl 1,3'-diisocyanate, diphenylketone 3,3'-diisocyanate, diphenylketone 4,4'-diisocyanate.

The aforementioned diisocyanates are conveniently partially reacted in a polar solvent with aromatic anhydrides. The aromatic anhydride has a benzene, naphthalene, diphenyl, diphenylketone or diphenylether nucleus which nucleus carries an anhydride group. The acid anhydride reactant has at least one additional reactive substituent; the additional reactive substituent is an anhydride group, a carboxyl group or a hydroxy group. The carboxyl group is preferred. Non-reactive substituents may be present on the nucleus; for example, alkyl groups containing 1 to 4 carbon atoms, nitro groups, halides such as chlorine or bromine. The term "non-reactive group" means groups which are not reactive under the conditions of the process, whereas the term "reactive group" or "reactive substituent" means a group which is reactive with the isocyanato group.

Illustrative of the anhydride reactants which may be used are: trimellitic anhydride (the anhydride of trimellitic acid), ethylene bis(4-trimellitate anhydride), hemimellitic anhydride, pyromellitic di-anhydride, isatoic anhydride (the anhydride of N-carboxy anthranilic acid), hydroxyphthalic anhydride, methyltrimellitic anhydride, 4'-carboxy diphenyl 3,4-dicarboxylic anhydride, di(phenyldicarboxylic anhydride) ketone, and di(phenyldicarboxylic anhydride) ether, and benzophenone.

To prepare the coating solution the aromatic acid anhydride derivative is reacted with the diisocyanate at a temperature of about 150° to 300° F. in an organic polar solvent to produce the novel wire enamel coating. Representative solvents are N,N-dimethylacetamide, N-methylpyrrolidone, N,N-dimethylformamide, dimethylsulfoxide and the like with N,N-dimethylacetamide and N-methylpyrrolidone being preferred. The diisocyanate and aromatic anhydride are present in a molar ratio of 1:1 to 1.4:1. It is essential that reaction does not proceed to the stage where insoluble polymers are formed. To obviate this it is helpful to cool the reaction mixture to a temperature of 32° to 85° F. The cooled coating solution of the reaction product of diisocyanate and the aromatic anhydride in a polar solvent is applied to a wire or other surface and heated at a temperature of about 200° to 420° C. After this heat treatment a coated wire is produced where the coating is insoluble in the organic polar solvent.

The novel coating solutions are prepared by dissolving a diisocyanate and an aromatic anhydride, said anhydride having benzene, naphthalene, diphenyl, diphenylketone or diphenylether nucleus bearing as the reactive substituents (1) an acid anhydride group and (2) another substituent group selected from acid anhydride, carboxyl and hydroxyl, in a nitrogen or sulfoxide containing polar solvent boiling above 300° F. at a temperature of about 150° to 300° F., maintaining the molar ratio of the diisocyanate to the aromatic anhydride of 1:1 to 1.4:1 and then cooling the reaction mixture to about 32° to 85° F. so that the reaction does not go to completion but remains in solution wherein the anhydride diisocyanate reaction product is maintained at about 15 to 40 weight percent of the total coating solution. Coating solutions wherein the amount of the aromatic anhydride diisocyanate reaction product is different than the range indicated tend to make poor wire enamel coatings which tend to be brittle and not useful in wire enamel application.

In some instances, it is desired to modify the properties of the coating solution through the utilization of suitable reactants with different functionalities. To illustrate, polyisocyanates with more than two isocyanato groups such as triisocyanates can be used to form polymers with varying degrees of solubility and varying amounts of cross-linking. Blocking of some isocyanato groups with phenols and the like can be utilized to limit the cross-linking to the final products.

The following examples illustrate the preparation and utilization of a particular embodiment of this invention. It will be understood that this embodiment is for illustrative purposes and does not purport to be wholly definitive with respect to conditions or scope.

EXAMPLE I 13.4 grams of trimellitic acid anhydride and 21 grams of 4,4' methylene bis phenyl isocyanate were dissolved in 80 grams of N,N dimethyl formamide. The above ingredients were heated to a temperature of about 230° to 280° F. for several minutes with agitation. Complete solution of the ingredients was effected and the solution remained clear and stable on cooling to room temperature. A portion of the same solution was refluxed at 290° to 300° F. for two hours. The solution remaind clear and stable on cooling to room temperature. These solutions were applied to cold rolled steel and copper panels with a Bird applicator at a wet film thickness of .003". The panels were cured for 2 minutes in a circulating air oven in which the temperature was maintained at 600° F.

The cured films were clear and glossy and had a light amber color. They were exceptionally hard and tough. They can be impacted with a force of 80 in.-lbs. with no failure. They are acetone resistant and show no signs of failure after 16 hours immersion in boiling water. A solution of 2% NaOH was applied to the panels for 16 hours with no failure. The coated panel can be held in the flame of a Bunsen burner for several minutes with no failure. It can be held at 500° F. for 16 hours with no apparent loss of film integrity.

EXAMPLE II 20.5 grams of ethylene bis(4-trimellitate anhydride) and 16.3 grams of 4,4' methylene bis phenyl isocyanate were dissolved in 77 grams of N-methyl pyrrolidone. The above ingredients were heated with stirring at a temperature of 250° to 290° F. for several minutes. A stable solution resulted which gave cured film properties similar to those obtained in Example I.

EXAMPLE III 37.2 grams of trimellitic acid anhydride were dissolved in 300 grams of N-methylpyrrolidone. Then 52.8 grams of diphenyl ether 4,4' diisocyanate were added in portion under a nitrogen blanket and constant agitation while the solution was held at 110° C. Upon completion of the diisocyanate addition the temperature of the reaction mixture was raised to 125° C. and held between 125–130° C. for 1 hour after which time a 1 gram sample was taken (Sample 3A). The reaction mixture was heated for one additional hour at 125° C.–130° C. and a 1 gram sample was withdrawn (Sample 3B). An additional 0.2 gram of the diisocyanate was added and the reaction mixture held for 1 hour at 125° C.–130° C. 100 grams were withdrawn (Sample 3C).

Samples were characterized as follows:

Sample 3A

The sample had a Gardner viscosity equivalent to 22.7 poises. Films were cast from this solution on glass and then heat-treated at two successive temperatures, the first for 30 minutes at 300° F. then for 5 minutes at 600° F. The cured films were clear, flexible and tough, withstanding multiple creasing operations without failure.

Sample 3B

The sample had a viscosity of 27.0 poises. Films were casted as in Sample 3A above with comparable results.

Sample 3C

The sample contained 21.5% solid reaction product of trimellitic acid anhydride and diphenyl ether 4,4' diisocyanate in N-methylpyrrolidone. The intrinsic viscosity as measured in N,N dimethylacetamide at 25° C. was 0.78. Films were cast and heat-treated as in Samples 3A and 3B then heat treated again for 1 hour at 250° C. The films were subjected to rapid folding-unfolding sequences. In the testing of 4 samples the average number of double-folds before failure was about 11,400. The thickness of these films was 1.4 mils.

EXAMPLE IV 19.00 grams of trimellitic acid anhydride and 2.18 grams of pyromellitic dianhydride were dissolved in 103 grams of N-methylpyrrolidone. 27.00 grams of methylene bisphenyl 4,4 diisocyanate were added under a nitrogen blanket and constant agitation while the solution was held at 110° C. The reaction mixture was heated to about 120–133° C. and held in that temperature range for 1 hour at which time $CO_2$ evolution was observed. Heating was continued and additional 0.5 gram diisocyanate was added. After 2½ hours at 120°–133° C. an additional 1.0 gram of diisocyanate was added to increase viscosity. The overall reaction-time was 3 hours.

Samples of the reaction mixture contained 29.13 weight percent solid reaction product in N-methylpyrrolidone. The solution viscosities were about 24.8 poises. Films cast on copper plate and glass from the reaction mixture were heat-treated at three successive temperatures: The first for 30 minutes at 300° F., the second for 5 minutes at 500° F. then for 3 minutes at 600° F. These films were clear and uniform.

EXAMPLE V 14.0 grams of trimellitic acid anhydride were dissolved in 80 grams of N-methyl pyrrolidone. 12.8 grams of metaphenylene diisocyanate were added in portions over a 45 minute period while the solution was held at about 110° C. The temperature of the reaction mixture was then raised to 125° C. and maintained at between 110° C. and 135° C. During this period 1.4 grams more of diisocyanate was added to give a final reaction mixture viscosity of 63 poises. The overall reaction times at about 125° C. was 2 hours and 25 minutes.

Films were cast and heat-treated as in Example IV.

I claim:
1. A process for preparing wire enamel coating solutions, said process comprises dissolving a diisocyanate and trimellitic acid anhydride or ethylene bis (4-trimellitate anhydride), in a nitrogen or sulfoxide containing polar solvent boiling about 300° F. at a temperature of about 150° to 300° F. maintaining the molar ratio of the diisocyanate to the aromatic anhydride of 1:1 to 1.4:1 and then cooling the reaction mixture to about 32 to 85° F. so that the reaction does not go to completion but remains in solution wherein the anhydride diisocyanate reaction product is maintained at about 14 to 40 weight percent of the total coating solution.

2. Process of claim 1 wherein the diisocyanate is 4,4′ methylene bis phenyl diisocyanate.

3. Process of claim 1 wherein the diisocyanate is 4,4 oxybis phenyl diisocyanate.

References Cited
UNITED STATES PATENTS

| | | | |
|---|---|---|---|
| 3,300,420 | 1/1967 | Frey | 260—2.5 |
| 3,314,923 | 4/1967 | Muller et al. | 260—78 |

MORRIS LIEBMAN, Primary Examiner

R. ZAITLEN, Assistant Examiner

U.S. Cl. X.R.

260—78, 32.6